United States Patent
Dadiomov

(10) Patent No.: US 8,250,558 B2
(45) Date of Patent: Aug. 21, 2012

(54) DYNAMIC LINKED LIBRARY ADD-ON FEATURES

(75) Inventor: Alexander Dadiomov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1233 days.

(21) Appl. No.: 11/606,845

(22) Filed: Nov. 30, 2006

(65) Prior Publication Data

US 2008/0134221 A1 Jun. 5, 2008

(51) Int. Cl.
*G06F 9/45* (2006.01)
(52) U.S. Cl. ........................ 717/163; 717/153; 717/166
(58) Field of Classification Search .................. None
See application file for complete search history.

(56) References Cited

U.S. PATENT DOCUMENTS

| | | | |
|---|---|---|---|
| 6,311,321 B1 | 10/2001 | Agnihotri et al. | |
| 6,449,541 B1 | 9/2002 | Goldberg et al. | |
| 6,769,126 B1 * | 7/2004 | Pekowski | 719/331 |
| 6,910,208 B1 | 6/2005 | Zimniewicz | |
| 7,000,230 B1 | 2/2006 | Murray et al. | |
| 2004/0098141 A1 | 5/2004 | Martin | |
| 2004/0111723 A1 | 6/2004 | Moles et al. | |
| 2004/0158811 A1 | 8/2004 | Guthrie et al. | |
| 2004/0189695 A1 | 9/2004 | Kurtz et al. | |
| 2005/0033728 A1 | 2/2005 | James et al. | |
| 2005/0223080 A1 * | 10/2005 | Gray | 709/213 |

FOREIGN PATENT DOCUMENTS

| | | |
|---|---|---|
| WO | WO9519001 A1 | 7/1995 |
| WO | WO0101252 A1 | 1/2001 |

OTHER PUBLICATIONS

Abbas et al., "An Extensible Infrastructure for Monitoring and Managing Applications in a Shared Library Environment", http://www.cs.nmsu.edu/please/ddl/papers/icse2005.pdf.
Birsan, Dorian, "On Plug-ins and Extensible Architectures", Date: Mar. 2005, pp. 40-46, vol. 3, Issue 2, ACM Press, New York, US, http://delivery.acm.org/10.1145/1060000.1053345/p40-birsan.pdf?.
Oreizy, Peyman, "Decentralized Software Evolution", Date: Apr. 20-21, 1998, http://www.ics.uci.edu/~peymano/papers/iwpse98/.

* cited by examiner

*Primary Examiner* — Chuck Kendall
(74) *Attorney, Agent, or Firm* — Russell S. Krajec; Krajec Patent Offices, LLC

(57) ABSTRACT

Add-on functions to a software application are made through a single dynamic linked library ('DLL'). After discovering, authenticating, and loading the DLL, the application may inspect the DLL to determine if it contains a function of a predetermined type. If the type is discovered, an object of the type may be instantiated and called. The inspection may evaluate metadata within the DLL to determine the precise characteristics of the function and compare the function to a predetermined type. Based on the authentication as well as the internal inspection of the DLL, extensions to existing software applications may be easily distributed and readily installed in an atomic fashion.

19 Claims, 3 Drawing Sheets

DYNAMIC LINKED LIBRARY ADD-ON FEATURES

BACKGROUND

Many software applications allow for some modification in the form of add-on components. Add-on components may enhance a software application and typically may provide increased specialization or customization for a particular use. For example, an application may provide financial analysis for general businesses. An add-on program may provide specialized analysis features that are directed toward a niche business with specialized requirements. Another example may be an application that provides a general user interface to network management. Add-on programs may provide specific management tools for specific services within the interface.

Installation of add-on features typically have multiple operations, including copying files to specific locations, changing registry values, updating configuration files, or operations. Installation in this manner can be made atomic, but an intentional or unintentional change to any of the components may render the application or add-on program unusable.

SUMMARY

Add-on functions to a software application are made through a single dynamic linked library ('DLL'). After discovering, authenticating, and loading the DLL, the application may inspect the DLL to determine if it contains a function of a predetermined type. If the type is discovered, an object of the type may be instantiated and called. The inspection may evaluate metadata within the DLL to determine the precise characteristics of the function and compare the function to a predetermined type. Based on the authentication as well as the internal inspection of the DLL, extensions to existing software applications may be easily distributed and readily installed in an atomic fashion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
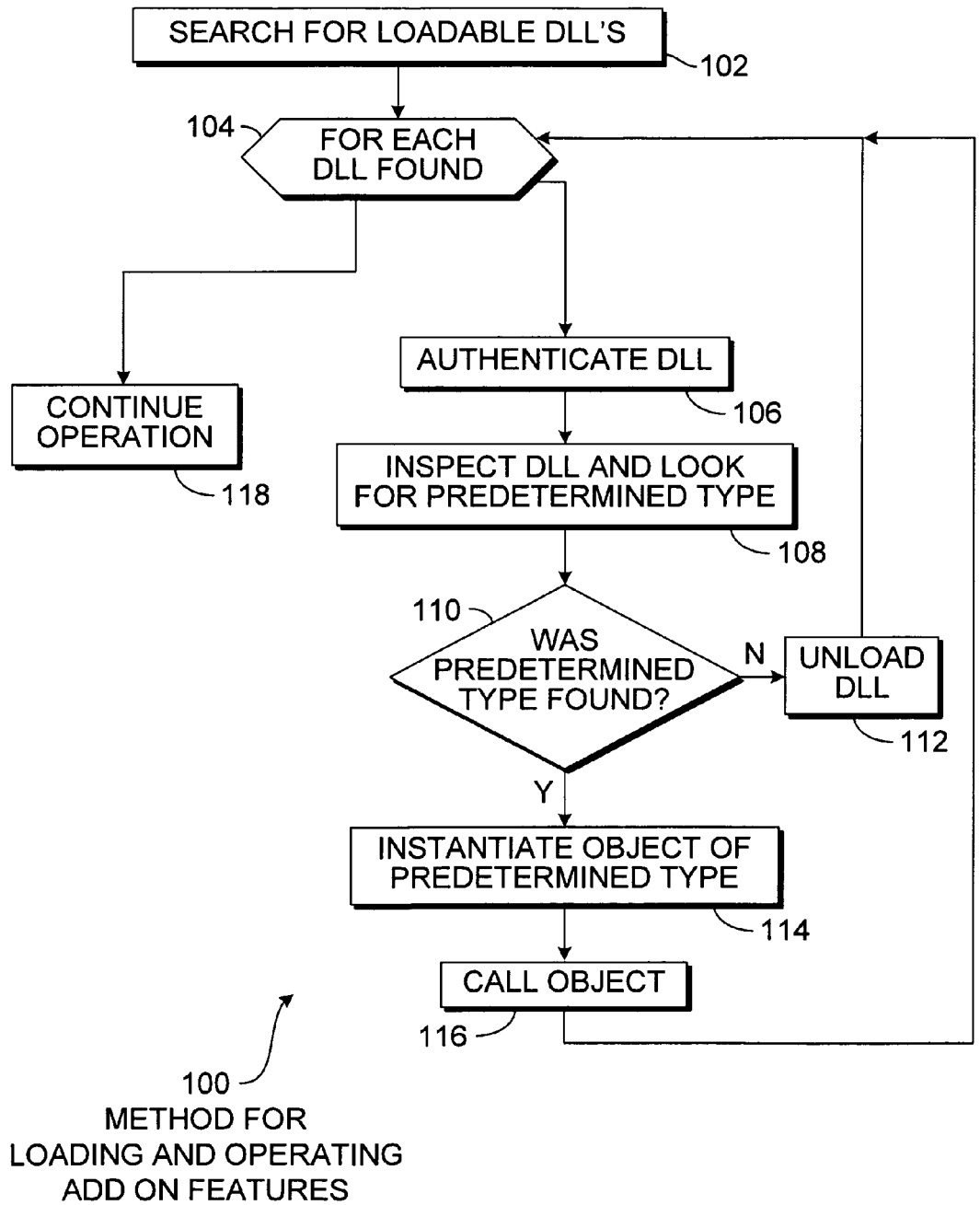
FIG. 1 is a flowchart illustration of an embodiment showing a method for finding, loading, inspecting, and instantiating a dynamic linked library.

Functions and upgrades may be added to a computer application by placing a dynamic linked library (DLL) in a search path of the application. During run time, the application searches for DLLs in the search path, inspects the DLL to determine if it contains an object of a specific type, and instantiates an object of the type, if one is found.

The inspection process includes evaluating the metadata associated with the DLL to determine if the types within the DLL are fully compatible with the software application. If the DLL is found to be compatible, it will then be instantiated.

Upgrades and changes to a computer application may be done in an atomic fashion using this method. A single file may contain all of the functionality and data necessary to implement a certain feature or function, and the file may be signed or otherwise authenticated to ensure security.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a method for loading and operating add on features using a dynamic linked library or DLL. A computer application may search for loadable DLLs in block 102. In some embodiments, a search may include searching one or more directories for DLLs, for searching many directories for DLLs with a specific naming convention, or a combination of searching specific directories for DLLs with specific naming conventions.

For each DLL found in block 104, a process of authenticating, inspecting, and instantiating the DLL is performed. The DLL is authenticated in block 106. The process of authentication may use any method, including verifying a digital signature, performing analysis including calculating and comparing checksums, using public key/private key decryption, or any other mechanism by which the DLL's authenticity may be verified.

The DLL is inspected in block 108. In the inspection process, the DLL is searched to determine if it includes an object of a specific type. In some instances, the DLL is inspected by using metadata associated with the DLL. One mechanism for doing so is using the reflection mechanism within the .NET® framework provided by Microsoft®. During the inspection process, the DLL is searched for a predetermined type. By verifying the objects within the DLL, the software application may ensure that the DLL does indeed contain objects properly designed to operate with the application. If the predetermined type was not found in block 110, the DLL may be unloaded from memory in block 112.

If the predetermined type was found in block 110, an object may be instantiated of that type in block 114 and the object may be called in block 116. After each DLL is processed in block 104, the operation of the software application may continue in block 118.

The process of embodiment 100 may be used as the basis for an architecture for an extensible software application. An application may have an interface defined by the type searched in block 108 that is either made public for third party software add on application or kept private for internal use. When the software application loads, various DLLs may be loaded, inspected, and instantiated to load the various components of a software application. In such an architecture, the main portion of a software application may merely load the various components found in the DLLs that happen to be present. Additional features may be provided by adding additional DLLs.

In some instances, such an architecture may be used for the main portion of a software application. For example, a main introduction menu or screen may be populated by sub-applications, each of which is defined by a separate DLL loaded using the method of embodiment 100. In another instance, the method of embodiment 100 may be used for add-on functionality that may be present in a sub-menu or other, smaller portion of the application.

Figure 2:
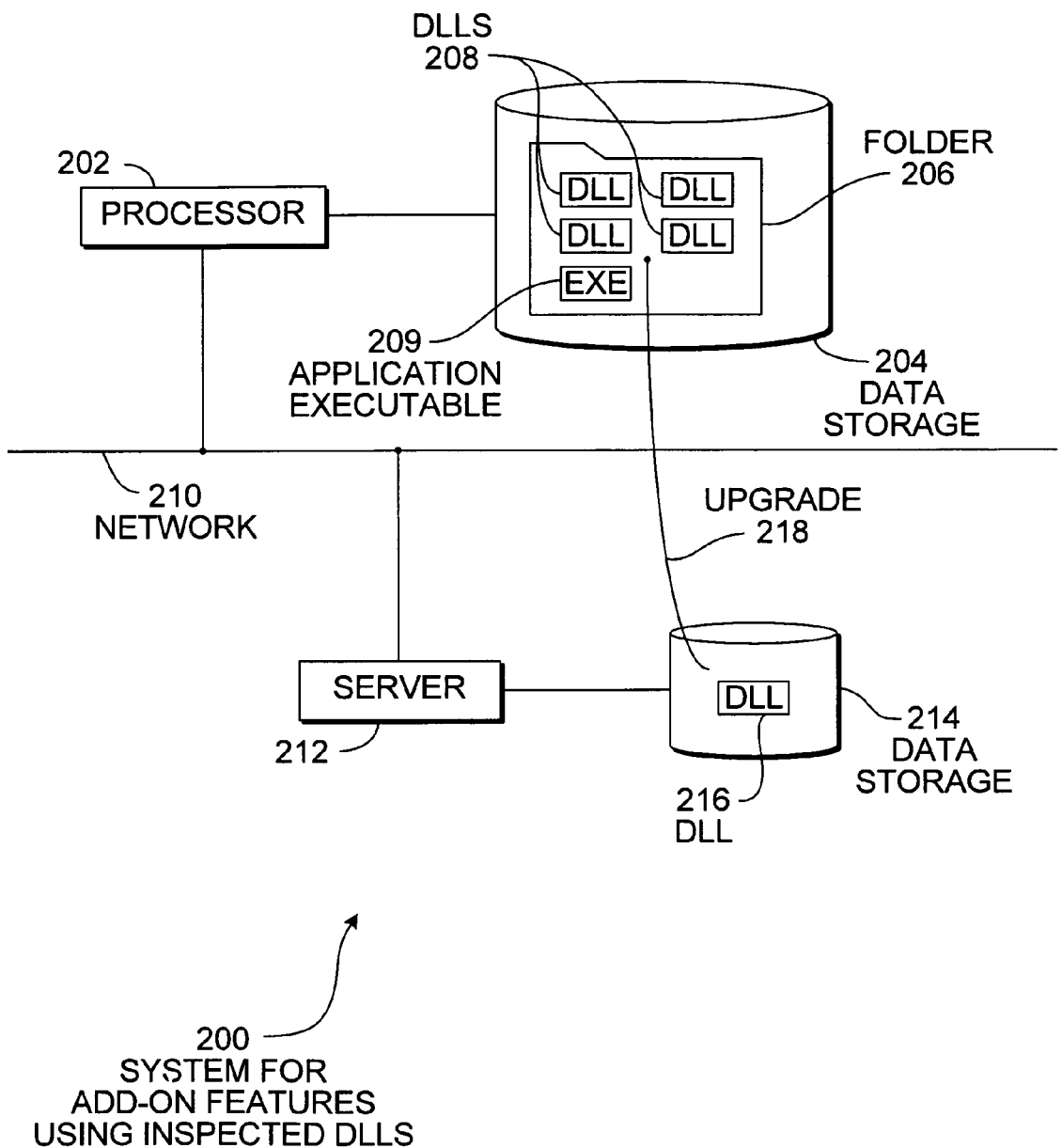
FIG. 2 is a diagram of an embodiment showing a system for add-on features using inspected dynamic linked libraries.

FIG. 2 is a diagram illustration of an embodiment 200 showing a system for add-on features using inspected DLLs. A processor 202 has a data storage device 204 attached. The data storage device 204 contains a folder 206 that has several DLLs 208 and an application executable 209. When the processor 202 executes the executable 209, each DLL 208 may be loaded, inspected, and instantiated as part of a software application.

The processor 202 is also attached to a network 210, to which server 212 is also attached. The server 212 has an attached data storage 214 that contains an add-on DLL 216. In order to upgrade the software application 209 for the processor 202, the DLL 216 may be copied to the folder 206. The software application 209 may then load, inspect, and instantiate the DLL 216. In some instances, the DLL 216 may be loaded automatically when the application 209 detects that another DLL has been added to the folder 206, or the DLL 216 may be loaded when the software application is first started. Other implementations may load a newly added DLL 216 at different stages of the software application's operation.

The embodiment 200 illustrates an atomic method for installing an upgrade or change to a software application. In addition to requiring a single operation to install an upgrade, the upgrade is kept in tact in a single file. In some other technologies for upgrading an application, multiple files and changes may be spread across various directories, registry settings, and other areas. When an upgrade requires changes to several locations within a computer system, it loses atomicity in that an intentional or unintentional change to any one of the several locations required for the upgrade to function may render the upgrade unusable. The embodiment 200 is able to contain an upgrade into a single file that can be authenticated and checked for integrity at any point.

Various methods may be used to perform an upgrade, of which embodiment 200 is but one example. The upgrade process consists of placing a DLL in a location so that it can be found by a computer application that will call it. In some examples, such as the embodiment 200, the DLL may be placed in the same folder or directory as the executable. In other embodiments, specific directories or groups of directories may be searched for applicable DLLs. In some cases, the file name or other metadata about the DLL may be searched to find an upgrade DLL.

Some upgrade methods may include distributing an upgrade DLL through a network 210 such as a local area network, a company-wide network, or the Internet. Other upgrade methods may include distributing a diskette or other detachable media, email, or any other distribution method.

An upgrade may include a mechanism by which a DLL is added to a software application, and may also include instances where an existing DLL is replaced by a new one.

Figure 3:
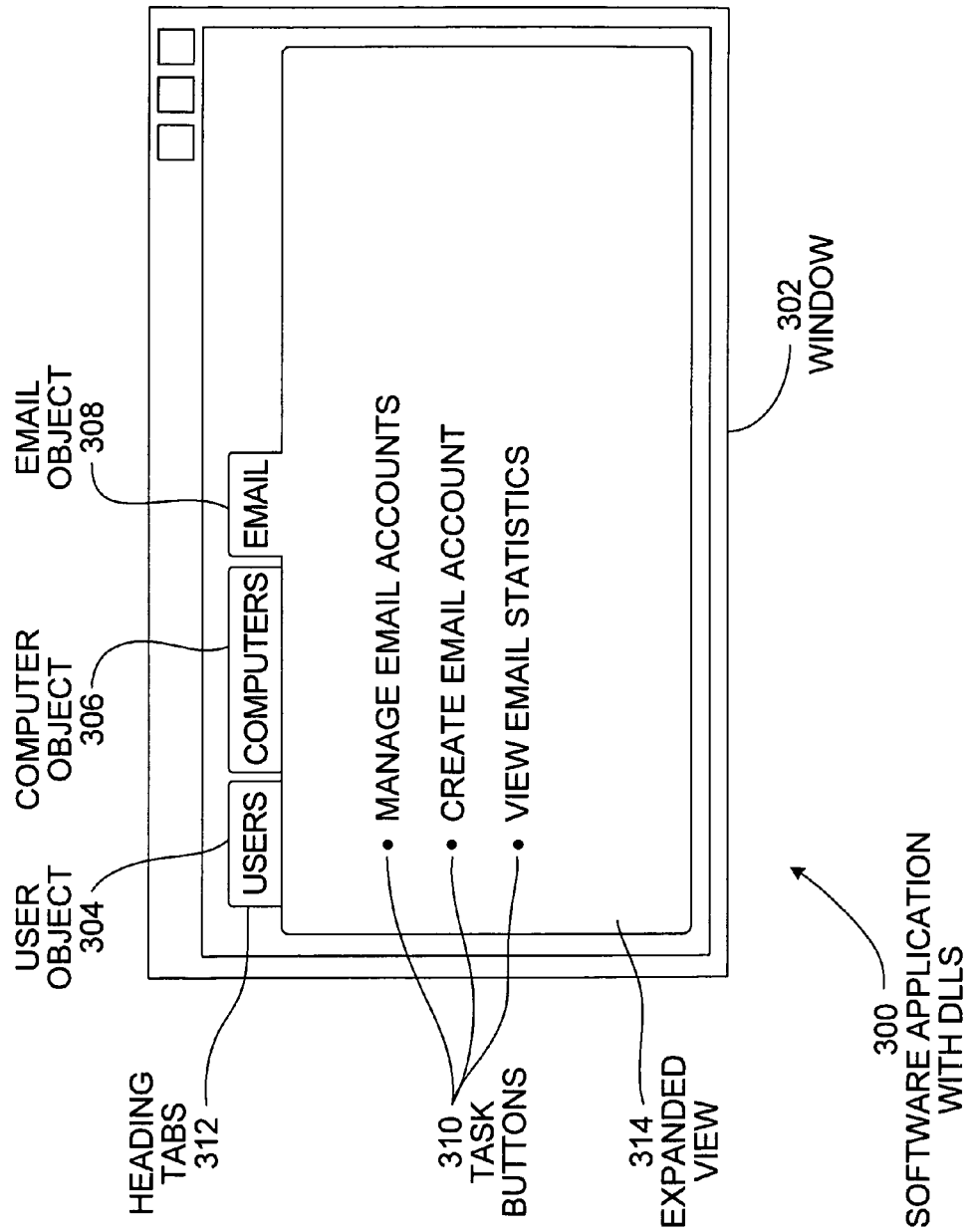
FIG. 3 is an illustration of an embodiment showing a window of a software application with inspected dynamic linked libraries.

FIG. 3 is an illustration of an embodiment 300 showing a software application architected by loading, inspecting, and instantiating DLLs. The window 302 is an illustration of a monitoring application for a network of computers. The three main headings in the application may be instantiations of DLLs that are loaded, inspected, and instantiated. The three headings are a user object 304, a computer object 306, and an email object 308. The email object 308 is opened to reveal various task options 310 under the email heading.

The embodiment 300 is an example of a computer application that may comprise an application shell that is populated by various objects, each object being a separate DLL that is found, loaded, inspected, and instantiated to generate a heading tab 314. When any of the heading tabs 314 are selected, an expanded view 314 may present a detailed listing of options available to the user. Each separate DLL may contain the data and functions to create a heading tab 312, an expanded view 314, and the functions associated with the various task buttons 310.

The embodiment 300 may be an extensible software platform that may be tailored to specific applications merely by adding or removing DLLs. For example, if a version of the application were adapted to monitor various users and computers on a network but without managing email functions, the email DLL may be excluded from the version. Similarly, if a version were to include a data backup functionality, a DLL for data backup may be added to the search path for the application and loaded in the same manner as the other DLLs.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   locating a single dynamic linked library;
   loading said single dynamic linked library into memory;
   inspecting said single dynamic linked library and finding a function of a predetermined type within said single dynamic linked library;
   instantiating an object of said predetermined type; and
   calling said object to deploy the function to a software application from said single dynamic linked library.

2. The method of claim 1 further comprising:
   authenticating said single dynamic linked library.

3. The method of claim 1 further comprising:
   verifying a signature on said single dynamic linked library.

4. The method of claim 1 wherein said single dynamic linked library is located within a predetermined directory.

5. The method of claim 1 wherein said single dynamic linked library comprises a function to a software application.

6. The method of claim 1 wherein said single dynamic linked library comprises a user interface component to a software application.

7. A computer readable medium not comprising a signal but comprising computer executable instructions adapted to perform the method of claim 1.

8. A device comprising:
   a data storage system;
   a processor adapted to execute an application, said application adapted to:
      locate a single dynamic linked library;
      load said single dynamic linked library into memory;
      inspect said single dynamic linked library and finding a function of a predetermined type within said single dynamic linked library;
      instantiate an object of said predetermined type; and
      call said object to deploy the function to a software application from said single dynamic linked library.

9. The device of claim 8 further comprising:
   authenticating said single dynamic linked library.

10. The device of claim 8 further comprising:
    verifying a signature on said single dynamic linked library.

11. The device of claim 8 wherein said single dynamic linked library is located within a predetermined directory.

12. The device of claim 8 wherein said single dynamic linked library comprises a function to a software application.

13. The device of claim 8 wherein said single dynamic linked library comprises a user interface component to a software application.

14. A method of deploying a function to a software application, said method comprising:
    installing said software application on a first system;
    operating said software application on said first system;
    copying a single dynamic linked library to said first system;
    finding said single dynamic linked library;
    loading said single dynamic linked library;
    inspecting said single dynamic linked library and finding a function of a predetermined type within said single dynamic linked library;
    instantiating an object of said predetermined type; and
    calling said object to deploy the function to a software application from said single dynamic linked library.

15. The method of claim 14 further comprising:
    authenticating said single dynamic linked library.

16. The method of claim 14 further comprising:
    verifying a signature on said single dynamic linked library.

17. The method of claim 14 wherein said single dynamic linked library is located within a predetermined directory.

18. The method of claim 14 wherein said single dynamic linked library comprises a function to a software application.

19. The method of claim 14 wherein said single dynamic linked library comprises a user interface component to a software application.

\* \* \* \* \*